(12) United States Patent
Wang

(10) Patent No.: US 8,027,247 B2
(45) Date of Patent: Sep. 27, 2011

(54) METHOD AND ROUTER FOR CONTROLLING GRACEFUL RESTART STATUS

(75) Inventor: Lixing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 12/463,190

(22) Filed: May 8, 2009

(65) Prior Publication Data

US 2009/0219807 A1  Sep. 3, 2009

Related U.S. Application Data

(63) Continuation of application No. PCT/CN2007/070949, filed on Oct. 24, 2007.

(30) Foreign Application Priority Data

Nov. 10, 2006  (CN) .......................... 2006 1 0138274

(51) Int. Cl.
  *H04J 1/16* (2006.01)
(52) U.S. Cl. ...................................... 370/216; 370/221
(58) Field of Classification Search .................. 370/216, 370/221, 242, 241, 254, 244, 389, 351, 392, 370/395.62, 400, 401, 410, 419, 428, 229, 370/230, 230.1, 236, 252, 352, 395.41, 402, 370/422, 429, 468; 709/223, 230, 238, 229
See application file for complete search history.

(56) References Cited

U.S. PATENT DOCUMENTS

| | | | | |
|---|---|---|---|---|
| 7,082,128 B1* | 7/2006 | Aggarwal | ..................... | 370/389 |
| 7,130,304 B1* | 10/2006 | Aggarwal | ..................... | 370/389 |
| 7,139,272 B1* | 11/2006 | Aggarwal et al. | ............ | 370/392 |
| 7,680,028 B1* | 3/2010 | Zamfir et al. | ................. | 370/216 |
| 2003/0140167 A1* | 7/2003 | Harvey et al. | ................. | 709/238 |
| 2003/0210705 A1* | 11/2003 | Seddigh et al. | ............... | 370/419 |
| 2005/0213498 A1* | 9/2005 | Appanna et al. | .............. | 370/216 |
| 2006/0171404 A1* | 8/2006 | Nalawade et al. | ............ | 370/401 |
| 2007/0053359 A1* | 3/2007 | Wu et al. | ....................... | 370/392 |

(Continued)

FOREIGN PATENT DOCUMENTS

CN  1599325 A  3/2005

OTHER PUBLICATIONS

Written Opinion of the International Searching Authority dated Jan. 31, 2008 in connection with International Patent Application No. PCT/CN2007/070949.

(Continued)

*Primary Examiner* — Aung S Moe
*Assistant Examiner* — Abdullah Riyami

(57) ABSTRACT

A method for controlling the Grace Restart (GR) status is disclosed. The method includes: entering a GR status when a router detects that neighbor relationship with a neighbor router breaks and the router itself does not restart; receiving a neighbor relationship establishing message sent by the neighbor router; and quitting the GR status when the router detects that the message does not indicate a restart of the neighbor router. A router is also disclosed. The router includes a neighbor relationship testing module restart testing module, a relationship message receiving and processing module and a GR module. The solution is able to detect timely that a router mistakenly enters a Grace Restart status. Thus, unnecessary signaling and data interaction are reduced, and CPU resource is less occupied. In addition, a newly generated routing can be delivered to the LSP, which improves the rate of a success data transfer.

4 Claims, 4 Drawing Sheets

U.S. PATENT DOCUMENTS

| | | | |
|---|---|---|---|
| 2007/0189177 A1* | 8/2007 | Zhai | 370/244 |
| 2008/0031236 A1* | 2/2008 | Yang et al. | 370/389 |
| 2008/0031239 A1* | 2/2008 | Kapoor et al. | 370/389 |
| 2008/0192762 A1* | 8/2008 | Kompella et al. | 370/410 |
| 2010/0287305 A1* | 11/2010 | Kompella | 709/238 |

OTHER PUBLICATIONS

A. Farrel, "Fault Tolerance for the Label Distribution Protocol (LDP)", Network Working Group, Feb. 2003, 47 pages.

M. Leelanivas, et al., "Graceful Restart Mechanism for Label Distribution Protocol", Network Working Group, Feb. 2003, 11 pages.

L. Berger, "Generalized Multi-Protocol Label Switching (GMPLS) Signaling Resource Reservation Protocol-Traffic Engineering (RSVP-TE) Extensions", Network Working Group, Jan. 2003, 38 pages.

A. Satyanarayana, et al., "Extensions to GMPLS RSVP Graceful Restart", Network Working Group, Oct. 2005, 22 pages.

* cited by examiner

METHOD AND ROUTER FOR CONTROLLING GRACEFUL RESTART STATUS

CROSS-REFERENCE TO RELATED APPLICATIONS

This application is a continuation of International Application No. PCT/CN2007/070949, filed on Oct. 24, 2007, which claims the benefit of Chinese Patent Application No. 200610138274.2, filed on Nov. 10, 2006, both of which are hereby incorporated by reference in their entireties.

FIELD OF THE INVENTION

The present invention relates to the field of graceful restart, and in particular, to a method and router for controlling graceful restart status.

BACKGROUND

Graceful Restart (GR) refers to a technique that ensures normally going on of data forwarding and ensures critical services being uninterrupted when a protocol is restarted. The GR technique is one of High Availability (HA) techniques. The HA is a whole set comprehensive technologies, including redundant fault-tolerant, link guarantee, node fault recovery and flow engineering. GR is a redundant fault-tolerant technique, which, at present, is broadly used inactive/standby switchover and system update, in order to ensure an uninterrupted forwarding of critical services.

Currently, multiprotocol label switching (MPLS) protocols that support GR include: Label Distribution Protocol (LDP) and Resource Reservation Protocol (RSVP). The two protocols add parameters in relation to GR in initializing message of the protocol when supporting GR, and such parameters interact when neighbor relationship is established between routers to help GR's proceeding.

Taking LDP as an example, the current GR process is explained, as shown in FIG. 1, and its specific steps are as follows:

Step 101: Router A determines that neighbor router B is restarted and enters GR status, taking itself as helper end while starting a connection timer.

Step 102: The router A searches LSP of the neighbor router B in itself, and marks on the LSP.

The LSP will be interacted when the router A and router B establish a neighbor relationship.

Step 103: The router A sends a neighbor relationship establishing message to the neighbor router B.

Step 104: The router A determines whether a neighbor relationship establishing message sent by the neighbor router B is received prior to timeout of the connection timer; if yes, the process proceeds to step 105; otherwise, the process proceeds to step 106.

Step 105: The router A keeps the GR status, sends the marked LSP to the neighbor router B, and this flow terminates.

Step 106: The router A deletes the marked LSP and quits the GR status.

Currently, an LDP-supported router determines that a neighbor router restarts mainly through the following manners:

Manner 1, the router detects that the Transmission Control Protocol (TCP) interface with the neighbor router is close, and then determines that the neighbor restarts.

Since the LDP runs on TCP, when the TCP connection breaks, the LDP certainly is disconnected.

Manner 2, the router detects that the HoldTime timer for maintaining the neighbor relationship is timeout, and then determines that the neighbor router restarts.

The HoldTime timer is the timer configured to maintain neighbor relationship. If the router fails to receive a Hello message sent by the neighbor router within timing period of the HoldTime timer, then it deems the neighbor router restarts.

The RSVP-supported router will determine the neighbor relationship breaks and then deems the neighbor router restarts when it fails to receive the Hello message sent by the neighbor router three times of continuous.

It can be seen that both of the LDP-supported router and the RSVP-supported router determine that the neighbor router restarts by detecting the turning off of the neighbor relationship. However, in fact, the neighbor router might not restart when the neighbor relationship breaks. For example, it is possible that the neighbor router cannot send out the Hello message in time due to the system being busy or due to the problem of protocol process per se. At this time, the local router might deem the neighbor router restarts when it detects that the neighbor relationship breaks; or, in the case that two routers connect via a switch, when the physical link of one of the routers goes wrong, the other might deem the neighbor router restarts as the turning-off of the neighbor relationship is detected. The above cases may cause the router entering into GR status by mistake.

The following disadvantages may result from the entering into GR status by mistake:

1. It will cause unnecessary signaling between routers, data interaction, and occupancy of CPU resources.

2. It might cause failure of data forward, the reason is that, considering that some routes in relation with a router might shock when the router being in GR status, current protocols prescribes that when a router is in GR status, the route newly generated on this router cannot use LSP that the route assigned before entering into GR status but being invalid when being in the GR status corresponds to. That is, when the router enters GR status, if it detects a route that a certain assigned route that the LSP corresponds to is invalid, then the LSP cannot be released immediately, but be preserved to the end of the GR status; and when the GR status terminates, if the route that the LSP corresponds to is still unavailable, then the LSP will be released to be assigned to a newly generated route for usage. Obviously, this may result in the following problems: if the amount of the routes newly generated by the router is large when the router is in GR status, then it is possible to result in that the LSP of the router not enough, making the newly generated routes being unavailable due to no LSP being able to be assigned, so that data forward will fail. For example, a certain router can support 100 thousand pieces of LSPs at most, before the router enters GR status, it has assigned 90 thousand pieces of LSPs to generated routes, then when the router is in GR status, it can only assign 10 thousand pieces of LSPs more, if the amount of the newly generated routes when being in GR status is more than 10 thousand, e.g. 30 thousand, then there will be 20 thousand pieces of routes unavailable as they cannot be assigned LSP, so that 20 thousand destination addresses cannot reach in the period of GR status.

Thus, when entering GR status by mistake, it must be detected in time and quitted, in order to eliminate persistent duration of the wrong GR status.

SUMMARY

One purpose of embodiments of the present invention is to provide a method and router for controlling GR status to reduce duration of wrong GR status.

The solution of the present invention is implemented as below.

A method for controlling graceful restart (GR) status includes: entering a GR status when a router detects that neighbor relationship with a neighbor router breaks and the router itself does not restart; receiving a neighbor relationship establishing message sent by the neighbor router; and quitting the GR status when the router detects that the message does not indicate a restart of the neighbor router.

A method for controlling GR status includes: entering a GR status when a current router detects that neighbor relationship with a neighbor router breaks and the current router itself does not restart, then the current router; making a mark on a Label Switching Path (LSP) of the neighbor router stored in the current router; receiving a neighbor relationship establishing message sent by the neighbor router; and sending the marked LSP to the neighbor router when the current router detects that the message indicates the neighbor router restarts.

A router includes a neighbor relationship detecting module, a restart detecting module, a relationship message receiving and processing module, and a Grace Restart (GR) module.

The neighbor relationship detecting module is configured to: send a restart query indication to the restart detecting module after it is detected that the neighbor relationship with the neighbor router breaks; and send an entering indication to the GR module while sending a restart information reporting indication to the relationship message receiving and processing module, if a not-restart indication returned by the restart detecting module is received.

The restart detecting module is configured to return, upon the receipt of the restart query indication, a not-restart indication to the neighbor relationship detecting module if it is detected that the router itself does not restart.

The relationship message receiving and processing module is configured to send, upon receipt of the restart information reporting indication, a quitting indication to the GR module if it is detected that the neighbor relationship establishing message sent by the neighbor router does not indicate a restart of the neighbor router.

The GR module is configured to enter the GR status upon the receipt of the enter indication, and quit the GR status upon the receipt of the quitting indication.

A router includes a neighbor relationship detecting module, a restart detecting module, a relationship message receiving and processing module, a Grace Restart (GR) module and a Label Switching Path (LSP) storage module.

The neighbor relationship detecting module is configured to send a restart query indication to the restart detecting module after it is detected that the neighbor relationship with the neighbor router breaks, send an entering indication to the GR module and mark on LSP of the neighbor router stored in the LSP storage module and send a restart information reporting indication to the relationship message receiving and processing module if a not-restart indication returned by the restart detecting module is received.

The restart detecting module is configured to return, upon the receipt of the restart query indication, a not-restart indication to the neighbor relationship detecting module if it is detected that the router itself does not restart.

The relationship message receiving and processing module is configured to send, upon receipt of the restart information reporting indication, the marked LSP in the LSP storage module to the neighbor router if it is detected that the neighbor relationship establishing message sent by the neighbor router indicates a restart of the neighbor router.

The GR module is configured to enter GR status upon the receipt of the entering indication.

The LSP storage module is configured to store the LSP of the neighbor router.

Compared with the prior art, according to the present invention, a router enters GR status when it is detected that neighbor relationship with a neighbor router breaks and the router per se does not restart, then if it is detected that a neighbor relationship establishing message sent by the neighbor router does not indicate a restart of the neighbor router, then the router determines that the router enters the GR status by mistake and quits the GR status. In this way, when entering into the GR status by mistake, the router is capable to detect and quit in time to reduce duration of the wrong GR status, reduce unnecessary signaling and data interaction, and decrease the occupancy of CPU resources. In addition, the LSP that the invalid routing during the GR status corresponds can be assigned to a newly generated routing in time, so as to improve the successful data forwarding rate.

Additionally, according to the present invention, a router enters a GR status when it is detected that neighbor relationship with a neighbor router breaks and the router per se does not restart and then makes a mark on LSP of the neighbor router stored in the router itself. If it is detected that the neighbor relationship establishing message sent by the neighbor router indicates a restart of the neighbor router, then the router determines that it does not enter the GR status by mistake and sends the marked LSP to the neighbor router, so that when entering into the GR status, the router can timely get the knowledge that it enters a right GR status, in order to help the neighbor router to recover a normal data forwarding in time.

DETAILED DESCRIPTION

The present invention will be illustrated in detail below by reference to figures and specific embodiments.

Figure 1:
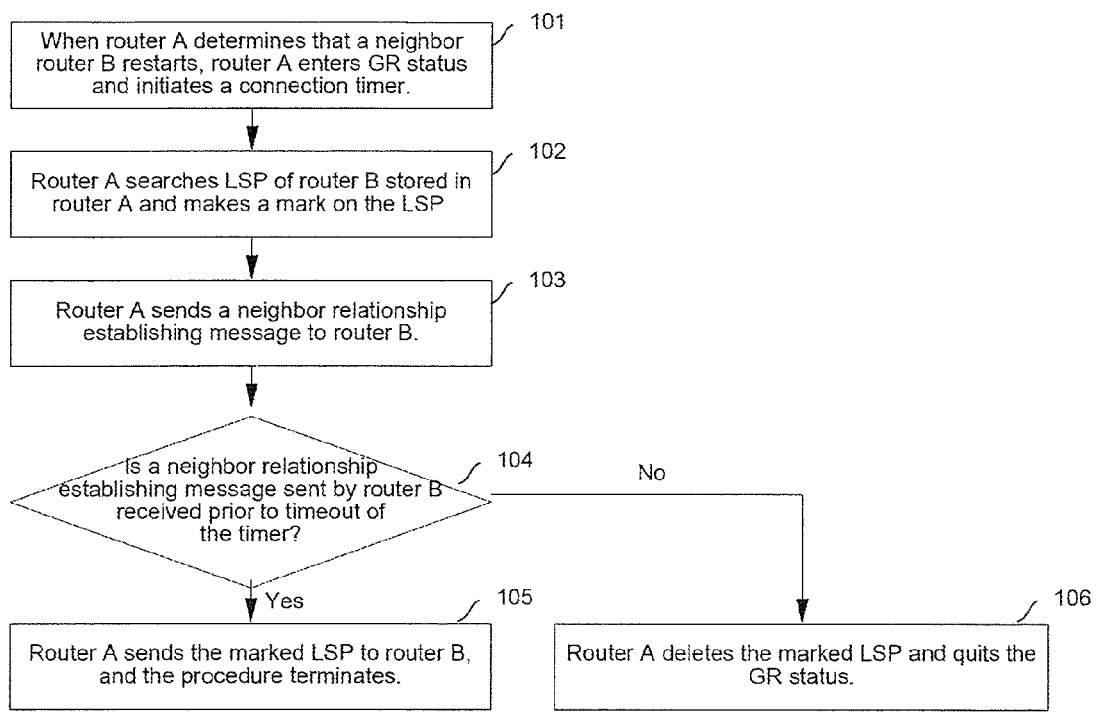
FIG. 1 is a flow chart of a current GR process.
Figure 2:
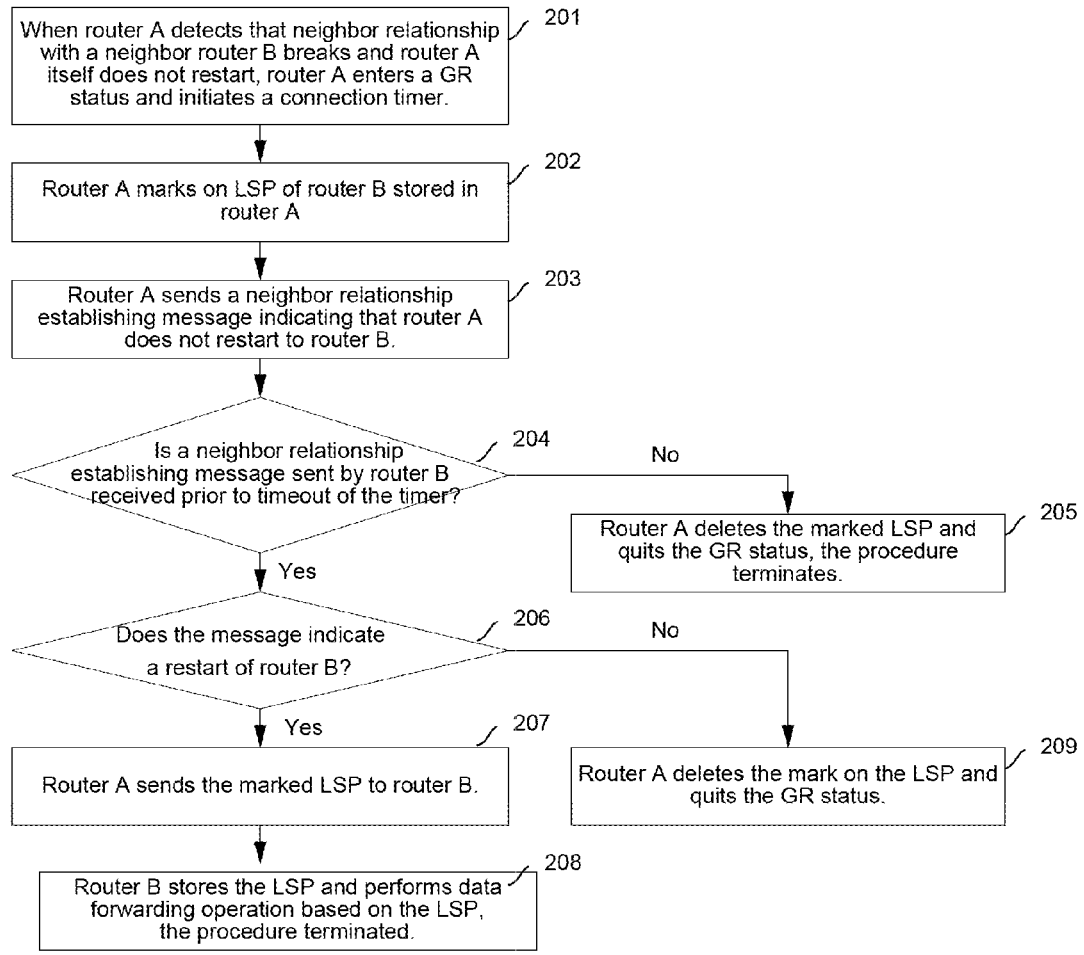
FIG. 2 is a flow chart for controlling GR status according to an embodiment of the present invention.

FIG. 2 is a flow chart for controlling GR status according to an embodiment of the present invention. As shown in FIG. 2, the specific steps are as follows.

Step 201: A router A detects that the neighbor relationship with a neighbor router B breaks and router A itself has not restarted, and then the router enters a GR status, takes itself as a Helper end and initiates a connection timer at the same time.

Step 202: The router A marks on LSP of the neighbor router B stored in router A.

Step 203: The router A sends to the neighbor router B a neighbor relationship establishing message, indicating that router A itself has not restarted.

According to the present invention, the neighbor relationship establishing message can indicate whether the local router restarts in following manners.

Manner 1: Identifying information is provided in the neighbor relationship establishing message for indicating whether the local router restarts; the specific means for implementing this manner includes:

1. One or more bit for indicating whether the local router restarts is newly added in the neighbor relationship establishing message. For example, when one bit is newly added, it may be set that when this bit is 0, it represents that the local router does not restart, and when this bit is 1, it represents that the local router restarts.

2. Any one of reserved bits in the neighbor relationship establishing message is used to indicate whether the local router restarts. When this reserved bit is 0, it represents that the local router does not restart, and when this reserved bit is 1, it represents that the local router restarts.

3. More than one specific reserved bit in the neighbor relationship establishing message is used to indicate whether the local router restarts. When these more than one specific reserved bits are all 0, it represents that the local router does not restart, and when these specific more than one reserved bits are all 1, it represents that the local router restarts.

The above identification representing that the local router does not restart and the identification representing that the local router restarts do not limit to 0 or 1, as long as they are different.

Manner 2: when the local router restarts, identification information is added in the neighbor relationship establishing message for indicating that the local router restarts, but when the local router does not restart, no identification information will be added in the neighbor relationship establishing message, i.e., the neighbor relationship establishing message will be identical with that in the prior art.

For example, when the local router restarts, one or more bit is added in the neighbor relationship establishing message, value of this bit can be set arbitrarily; but when the local router does not restart, no change will occur to the neighbor relationship establishing message.

Manner 3: when the local router does not restart, identification information is added in the neighbor relationship establishing message for indicating that the local router does not restart, but when the local router restarts, no identification information will be added in the neighbor relationship establishing message, i.e., the neighbor relationship establishing message will be identical with that in the prior art.

Especially, as to which one of the above three manners to be adopted, the router A and router B may pre-negotiate to determine the manner to be adopted, or information regarding the manner to be adopted may be preconfigured on the router A and router B by a network administrator, etc.

Step 204: The router A determines whether the neighbor relationship establishing message sent by the neighbor router B is received prior to the timeout of the connection timer; if so, the process proceeds to step 206; otherwise, the process proceeds to step 205.

Step 205: The router A deletes the marked LSP and quits GR status, and this flow terminates.

Step 206: The router A determines whether the message indicates that the neighbor router B restarts; if so, the process proceeds to step 207; otherwise, the process proceeds to step 209.

After the neighbor router B finds itself restarting, it will send to the router A a neighbor relationship establishing message, which indicates that the router B restarts. In particular, it may determine whether the neighbor relationship establishing message in this step 206 indicates that the router B restarts based on the manner adopted by the router A and the router B that makes the neighbor relationship establishing message being capable to indicate whether the local router restarts. For example:

If the manner 1 in step 203 is adopted, then the router A can determine whether the router B restarts based on the identification information in the neighbor relationship establishing message;

If the manner 2 in step 203 is adopted, then the router A can determine whether the router B restarts based on whether the neighbor relationship establishing message carries identification information; if it carries, then it determines that the router B restarts;

If the manner 3 in step 203 is adopted, then the router can determine whether the router B restarts based on whether the neighbor relationship establishing message carries identification information in the same way; if it does not carry, then it determines that the router B restarts.

Step 207: The router A continues keeping the GR status, and sends the marked LSP to the neighbor router B.

Step 208: The neighbor router B receives the LSP sent by the router A, saves the LSP, and performs data forward based on the LSP, and then this flow terminates.

Step 209: The router A deletes the mark on the LSP, and quits the GR status.

It can be seen from the flow illustrated by FIG. 2: after entering into GR status, if the router A receives the neighbor relationship establishing message sent by the router B that indicates the router B does not restart, then the router A will quit the GR status in time, so as to reduce the persistent duration of the wrong GR status, reduce unnecessary signaling, data interaction, and occupation of CPU resources; meanwhile it makes the newly generated routes being able to be assigned LSP in time, so as to improve the success rate of data forward.

Figure 3:
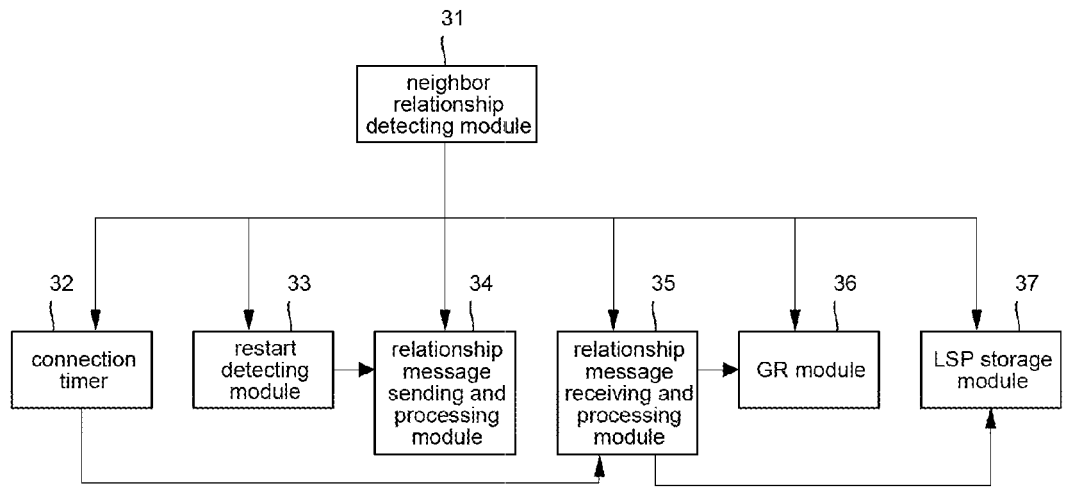
FIG. 3 is a schematic diagram of a router for controlling GR status according to an embodiment of the present invention.

FIG. 3 is a structure schematic diagram of a router for controlling GR status according to an embodiment of the present invention. As shown in FIG. 3, it mainly includes: a neighbor relationship detecting module 31, a connection timer 32, a restart detecting module 33, a relationship message sending and processing module 34, a relationship message receiving and processing module 35, a GR module 36 and an LSP storage module 37, in which:

The neighbor relationship detecting module 31 is configured to: send a restart query indication to the restart detecting module 33 after it detects that the neighbor relationship with the neighbor router breaks; upon receipt of a not-restart indication returned by the restart detecting module 33, send an entering indication to the GR module 36 while send an initiating indication to the connection timer 32; and send a not-restart sending indication to the relationship message sending and processing module 34 while mark on the LSP of neighbor router stored in the LSP storage module 37; and send a restart information reporting indication to the relationship message receiving and processing module 35.

In particular, the sub-function of the neighbor relationship detecting module 31, i.e. marking on the LSP of the neighbor router stored in the LSP storage module 37 while sending an entering indication to the GR module 36, can be accomplished by its sub-module (LSP mark adding module);

The sub-function, i.e. sending an initiating indication to the connection timer 32 upon receipt of the not-restart indication returned by the restart detecting module 33, can be accomplished by its sub-module (initiating indication generating module).

The connection timer 32 is configured to begin timing upon the receipt of the initiating indication sent by the neighbor relationship detecting module 31, and send a timeout indication to the relationship message receiving and processing module 35 when the timing is timeout.

The restart detecting module 33 is configured to return a not-restart indication to the neighbor relationship detecting module 31, upon the receipt of the restart query indication sent by the neighbor relationship detecting module 31, if it detects that it does not restart per se; or return a restart sending indication to the relationship message sending and processing module 34, if it detects that it restarts per se.

In particular, the function of the restart detecting module 33, i.e. if it detects that it restarts per se, then returning a restart sending indication to the relationship message sending and processing module 34, can be accomplished by its sub-module (restart indication sending module).

The relationship message sending and processing module 34 is configured to, upon receipt of the not-restart sending indication sent by the neighbor relationship detecting module 31, send a neighbor relationship establishing message indicating that it does not restart per se to the neighbor router; and upon receipt of the restart sending indication sent by the restart detecting module 33, send a neighbor relationship establishing message indicating that it restarts per se to the neighbor router.

The relationship message receiving and processing module 35 is configured to, upon receipt of the restart information reporting indication sent by the neighbor relationship detecting module 31, if it detects that the neighbor relationship establishing message sent by the neighbor router is not received prior to the receipt of the timeout indication sent by the connection timer 32, delete the marked LSP in the LSP storage module 37, and send a quitting indication to the GR module 36; if it detects that the neighbor relationship establishing message sent by the neighbor router is received prior to the receipt of the timeout indication sent by the connection timer 32, determine whether the message indicates the neighbor router restarts; and if yes, send the marked LSP stored in the LSP storage module 37 to the neighbor router; otherwise, send a quitting indication to the GR module 36 while deleting the mark on the LSP stored in the LSP storage module 37.

In particular, the function of the relationship message receiving and processing module 35, i.e. deleting the mark on the LSP stored in the LSP storage module 37 while sending a quitting indication to the GR module 36, can be accomplished by its sub-module (LSP mark deleting module).

GR module 36 is configured to enter GR status upon the receipt of the entering indication sent by the neighbor relationship detecting module 31; and quit the GR status upon the receipt of the quitting indication sent by the relationship message receiving and processing module 35.

LSP storage module 37 is configured to store the LSP of the neighbor router.

Figure 4:
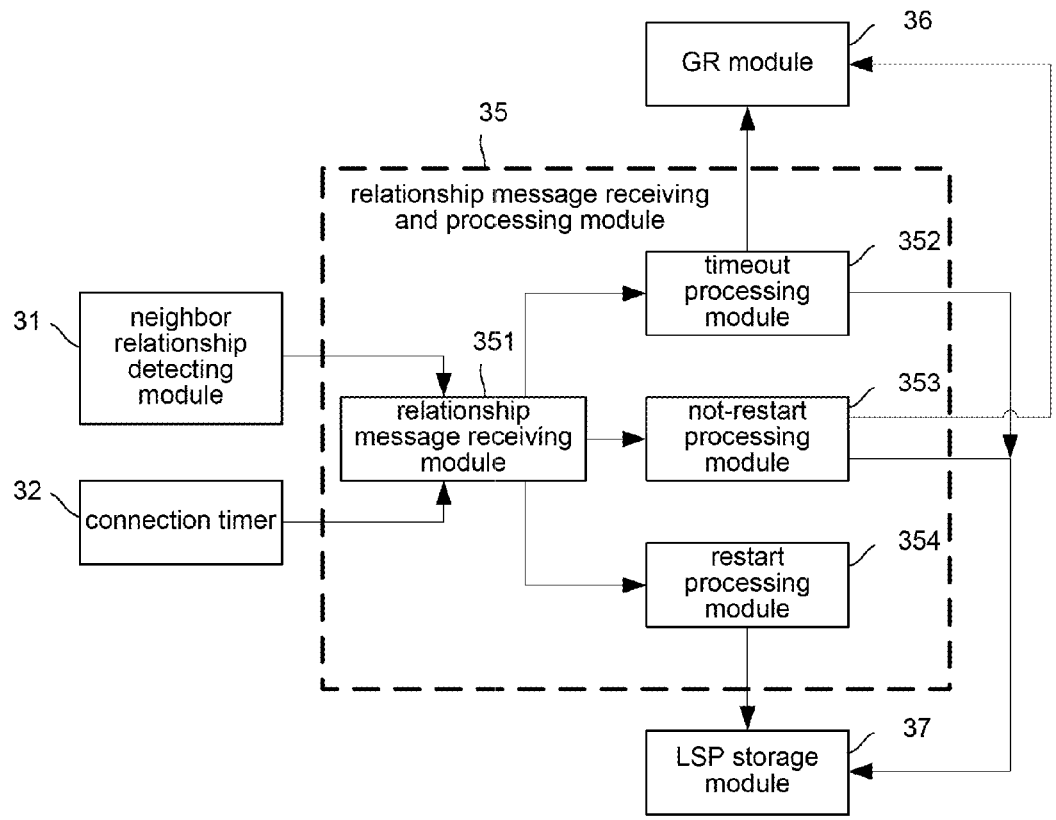
FIG. 4 is a structure schematic diagram of a relationship message receiving and processing module according to an embodiment of the present invention.

Especially, as shown in FIG. 4, the relationship message receiving and processing module 35 mainly includes: a relationship message receiving module 351, a timeout processing module 352, a not-restart processing module 353 and a restart processing module 354, in which:

The relationship message receiving module 351 is configured to send an initiating indication to the timeout processing module 351, upon the receipt of the restart information reporting indication sent by the neighbor relationship detecting module 31, if it detects that the neighbor relationship establishing message sent by the neighbor router is not received prior to the receipt of the timeout indication sent by the connection timer 32; or determine whether the message indicates the neighbor router restarts, if it detects that the neighbor relationship establishing message sent by the neighbor router is received prior to the receipt of the timeout indication sent by the connection timer 32, and send an initiating indication to the restart processing module 354 if the message indicates the neighbor router restarts, or x send an initiating indication to the not-restart processing module 353 if the message does not indicates the neighbor router restarts.

The timeout processing module 352 is configured to, upon the receipt of the initiating indication sent by the relationship message receiving module 351, delete the marked LSP in the LSP storage module 37, and send a quitting indication to the GR module 36.

The not-restart processing module 353 is configured to, upon receipt of the initiating indication sent by the relationship message receiving module 351, send a quitting indication to the GR module 36 while deleting the label on the LSP stored in the LSP storage module 37.

The restart processing module 354 is configured to, upon receipt of the initiating indication sent by the relationship message receiving module 351, send the marked LSP in the LSP storage module 37 to the neighbor router.

Hereinafter, three specific examples that apply the present invention are provided.

EXAMPLE 1

This example gives the GR process that a switch occurs a link failure while a router does not restart.

Figure 5:
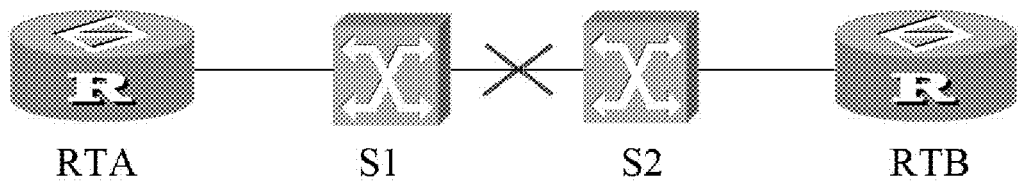
FIG. 5 is a schematic diagram of a link failure in application example 1 of the present invention.

As shown in FIG. 5, a router RTA connects to a router RTB via switches S1 and S2. When the link between S1 and S2 goes wrong, both of the RTB and the RTA will find the neighbor relationship with the router at opposite end breaks, so that both of the RTB and the RTA might deem itself become Helper end with respect to the opposite end, enter GR status, keep the neighbor relationship with the opposite end, and mark on the LSP of the opposite end stored in itself, meanwhile they continuously send to the opposite end a neighbor relationship establishing message, in which the reserved bit for indicating whether this end restarts is set to be 0 to represent this end does not restart.

When the link between the S1 and the S2 recovers, both of the RTB and the RTA will receive the neighbor relationship establishing message indicating that the opposite end does not restart sent by the opposite end, then the RTB and the RTA will delete the label on the originally marked LSP, and quit the GR status, while enter a flow for re-establishing the neighbor relationship.

EXAMPLE 2

This embodiment gives the GR process that a Hello message is not sent in time due to a router being busy or a problem of protocol process.

In this embodiment, a router RTA and a router RTB are neighbor routers. The RTB does not send a Hello message to the RTA due to being busy per se or a problem of protocol process. When the HoldTime timer for maintaining the neighbor relationship is timeout, if the RTA does not receive the Hello message sent by the RTB, then it determines that the neighbor relationship breaks, takes itself as the Helper end of the RTB, enters GR status, and marks on the LSP of RTB stored in itself, while it continuously sends a neighbor relationship establishing message to the RTB. The reserved bit for indicating whether this end restarts in this message is set to be 0 to represent this end does not restart.

When the RTB is not busy or the protocol process recovers, the RTB will process the neighbor relationship establishing message sent by the RTA, detect the information carried in this message that indicates the RTA does not restart, and then send a neighbor relationship establishing message to the RTA. The reserved bit for indicating whether this end restarts in this message is set to be 0. When the RTA receives this message to know that the RTB does not restart, it deletes the mark on the originally marked LSP and quits the GR status.

EXAMPLE 3

This example gives the GR process when a router restarts.

Figure 6:
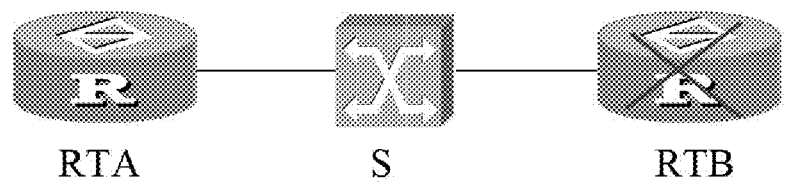
FIG. 6 is a schematic diagram of a router failure in application example 3 of the present invention.

As shown in FIG. 6, a router RTA and a router RTB are connected by a switch S. When the RTB goes wrong, the RTA will find the neighbor relationship with the RTB breaks, so that it will deem itself as Helper end, enter GR status, and mark on the LSP of RTB stored in itself, while it continuously sends a neighbor relationship establishing message that carries information for indicating it does not restart per se to the RTB.

After the RTB restarts, the RTB sends to the RTA a neighbor relationship establishing message that carries information for indicating it restarts per se. Upon receipt of this message, the RTA gets to know that the RTB restarts so that it sends the marked LSP to the RTB. At this time, both of the RTA and the RTB are in the GR status.

It shall be understood that a software for implementing the present invention can be stored in a computer readable medium, when the software is executed, the following steps are included: setting an indication of whether a router restarts in a neighbor relationship establishing message; a current router detects the neighbor relationship with a neighbor router breaks and does not restart per se, then enters GR status, and marks on the LSP of the neighbor router stored in itself, receives the neighbor relationship establishing message sent by the neighbor router, and when it detects that this message does not carry the indication that the neighbor router restarts, it quits the GR status and deletes the mark on the LSP. Examples of said medium comprise ROM, RAM, magnetic disc, optical disc, etc.

The above only refers to processes and method embodiments of the present invention, rather than limits the present invention. Any modification, equivalent, improvement and the like within the spirit and principle of the present invention shall be involved in the protection scope of the present invention.

What is claimed is:

1. A router comprising:
    a neighbor relationship detecting device, a restart detecting device, a relationship message receiving and processing device, and a Grace Restart (GR) device, wherein the neighbor relationship device is coupled to the relationship message receiving and processing device, and wherein the neighbor relationship detecting device sends a restart query indication to the restart detecting device after it is detected that a neighbor relationship with a neighbor router breaks; and sends an entering indication to the GR device while sending a restart information reporting indication to the relationship message receiving and processing device, if a not-restart indication returned by the restart detecting device is received;
    wherein the restart detecting device, upon the receipt of the restart query indication, returns a not-restart indication to the neighbor relationship detecting device if it is detected that the router itself does not restart;
    wherein the relationship message receiving and processing device, upon the receipt of the restart information reporting indication, sends a quitting indication to the GR device if it is detected that a neighbor relationship establishing message received from the neighbor router does not indicate a restart of the neighbor router;
    wherein the GR device enters the GR status upon the receipt of the enter indication; and quit the GR status upon the receipt of the quitting indication;
    wherein the neighbor relationship detecting device further comprises an initiating indication generating device configured to generate and output an initiating indication upon receipt of the not-restart indication sent by the restart detecting device;
    wherein the router further comprises a connection timer coupled to the neighbor relationship detecting device and configured to start timing upon the receipt of the initiating indication and send a timeout indication to the relationship message receiving and processing device when the timer times out; and
    wherein the relationship message receiving and processing device further comprises a relationship message receiving device and a timeout processing device, wherein:
        the relationship message receiving device is configured to send, upon the receipt of the restart information reporting indication sent by the neighbor relationship detecting device, an initiating indication to the timeout processing device if it is detected that the neighbor relationship establishing message sent by the neighbor router is not received prior to the receipt of the timeout indication sent by the connection timer; and
    the timeout processing device is configured to delete, upon the receipt of the initiating indication sent by the relationship message receiving device, a marked LSP in a LSP storage device and send a quitting indication to the GR device.

2. The router of claim 1, further comprising the LSP storage device configured to store an LSP of the neighbor router;
    wherein the neighbor relationship detecting module comprises an LSP mark adding device configured to mark on the LSP of the neighbor router stored in the LSP storage device when sending the entering indication to the GR device; and
    wherein the relationship message receiving and processing device comprises an LSP mark deleting device configured to delete the mark on the LSP in the LSP storage device when sending the quitting indication to the GR device.

3. The router of claim 1, wherein the restart detecting device comprises a restart indication sending device configured to generate and output a restart sending indication after it is detected that the router itself restarts; and
    wherein the router further comprises a relationship message sending and processing device coupled to the restart detecting device and configured to send a neighbor relationship establishing message indicating that the router itself restarts to the neighbor router upon the receipt of the restart sending indication.

4. The router of claim 2, wherein the restart detecting device comprises a restart indication sending device configured to generate and output a restart sending indication after it is detected that the router itself restarts; and
    wherein the router further comprises a relationship message sending and processing device coupled to the restart detecting device and configured to send a neighbor relationship establishing message indicating that the router itself restarts to the neighbor router upon the receipt of the restart sending indication.

* * * * *